United States Patent
Zhang et al.

(10) Patent No.: US 10,706,460 B2
(45) Date of Patent: Jul. 7, 2020

(54) SHARED ITEM MANAGEMENT SYSTEM AND METHOD, SHARED ITEM AND SHARED SERVER

(71) Applicant: BOE TECHNOLOGY GROUP CO., LTD., Beijing (CN)

(72) Inventors: Yongzhong Zhang, Beijing (CN); Junjie Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 52 days.

(21) Appl. No.: 16/047,289

(22) Filed: Jul. 27, 2018

(65) Prior Publication Data

US 2019/0043119 A1 Feb. 7, 2019

(30) Foreign Application Priority Data

Aug. 2, 2017 (CN) .......................... 2017 1 0655305

(51) Int. Cl.
| | |
|---|---|
| *G06F 15/16* | (2006.01) |
| *G06Q 30/06* | (2012.01) |
| *H04L 29/08* | (2006.01) |
| *G07F 17/00* | (2006.01) |

(52) U.S. Cl.
CPC ..... *G06Q 30/0645* (2013.01); *G07F 17/0057* (2013.01); *H04L 67/12* (2013.01); *H04L 67/18* (2013.01); *H04L 67/306* (2013.01)

(58) Field of Classification Search
CPC ....... H04L 67/12; H04L 67/18; H04L 67/306; G06Q 30/0645; G07F 17/0057
See application file for complete search history.

(56) References Cited

U.S. PATENT DOCUMENTS

| | | | | |
|---|---|---|---|---|
| 8,060,753 | B2 * | 11/2011 | King | G06F 21/32 340/10.1 |
| 8,738,034 | B2 * | 5/2014 | Leclercq | G01S 5/02 455/456.1 |
| 9,191,778 | B2 * | 11/2015 | Leclercq | G01S 5/02 |
| 9,516,012 | B2 * | 12/2016 | Chochois | G06F 21/6272 |
| 9,892,198 | B2 * | 2/2018 | Marlow | G06F 16/9535 |
| 10,108,727 | B2 * | 10/2018 | Marlow | G06F 16/9535 |

(Continued)

FOREIGN PATENT DOCUMENTS

| | | |
|---|---|---|
| CN | 103530602 A | 1/2014 |
| CN | 105946629 A | 9/2016 |

(Continued)

OTHER PUBLICATIONS

Chinese Office Action dated Jul. 18, 2019, from application No. 201710655305.X.

(Continued)

*Primary Examiner* — Moustafa M Meky
(74) *Attorney, Agent, or Firm* — Foley & Lardner LLP

(57) ABSTRACT

The present disclosure relates to a shared item management system and method, a shared item and a shared server. The shared item includes a collecting module configured to collect a user feature, a sending module configured to send the collected user feature, a receiving module configured to receive response information from outside, and a response module configured to cause the shared item to perform a predetermined response based on the response information.

9 Claims, 2 Drawing Sheets

(56) References Cited

U.S. PATENT DOCUMENTS

| | | | |
|---|---|---|---|
| 2006/0200683 A1* | 9/2006 | King | G06F 21/32 713/193 |
| 2009/0206988 A1* | 8/2009 | Chochois | G06F 21/6272 340/5.52 |
| 2013/0012226 A1* | 1/2013 | Leclercq | G01S 5/02 455/456.1 |
| 2014/0256362 A1* | 9/2014 | Leclercq | G01S 5/02 455/456.3 |
| 2016/0066160 A1* | 3/2016 | Leclercq | G01S 5/02 370/338 |
| 2018/0165373 A1* | 6/2018 | Marlow | G06F 16/9535 |
| 2018/0165754 A1* | 6/2018 | Motenko | G06Q 30/0643 |
| 2018/0365695 A1* | 12/2018 | Liu | G06Q 20/4014 |
| 2019/0005310 A1* | 1/2019 | Kim | G05D 1/02 |

FOREIGN PATENT DOCUMENTS

| | | |
|---|---|---|
| CN | 105976531 A | 9/2016 |
| CN | 106846125 A | 6/2017 |
| CN | 106846584 A | 6/2017 |
| CN | 106875533 A | 6/2017 |
| CN | 106875580 A | 6/2017 |
| CN | 106991749 A | 7/2017 |

OTHER PUBLICATIONS

Chinese Office Action dated Apr. 17, 2020, from application No. 201710655305.X.

\* cited by examiner

SHARED ITEM MANAGEMENT SYSTEM AND METHOD, SHARED ITEM AND SHARED SERVER

CROSS-REFERENCE TO RELATED APPLICATIONS

This application claims priority to Chinese Patent Application 201710655305.X, filed Aug. 2, 2017, the entire contents of which are incorporated herein by reference.

TECHNICAL FIELD

The present disclosure relates to a shared item management system and method, a shared item and a shared server.

BACKGROUND

In recent years, with the gradual implementation of the concept of sharing economy, various shared items have been developed, such as shared bikes, shared cars, shared chargers, shared umbrellas, and the like. Users can borrow and return shared items through applications (APP) installed in mobile terminals, which provide great conveniences to users and saves social resources.

SUMMARY

The present disclosure provides a shared item management system and method, a shared item and a shared server.

According to some arrangements of the present disclosure, a shared item management system includes a shared item and a shared server. The shared item includes a collecting module, a sending module, a receiving module and a response module.

The collecting module is configured to collect a user feature which is used to identify a user.

The sending module is configured to send the collected user feature.

The shared server is configured to verify the user feature and return server information according to a verification result.

The receiving module is configured to receive server information. The server information includes at least one of the verification result regarding verification of the user feature and/or instruction information for the shared item.

The response module is configured to cause the shared item to perform a predetermined response based on the server information.

According to an exemplary arrangement, the shared item management system further includes a positioning module configured to acquire location information of the shared item to send location information of the shared item to the shared server and/or an input device configured to receive input information from a user.

According to an exemplary arrangement, the collecting module is further configured to collect information of the shared item. The information of the shared item includes at least one of mechanical structure information of the shared item, status information of the shared item, and identification information of the shared item. The sending module is further configured to send the information of the shared item or the location information, so that the shared server performs matching according to the user feature and the information of the shared item and selects a shared item that matches the user feature. The receiving module is further configured to receive server information. The server information further includes identification information of the shared item that matches the user feature and/or a shared item parameter that matches the user feature. The response module is further configured to perform at least one of: assigning a shared item according to the identification information of the shared item that matches the user feature and a parameter of the shared item that matches the user feature, and adjusting the parameter of the shared item according to the identification information of the shared item that matches the user feature and the parameter of the shared item that matches the user feature.

According to some arrangements of the present disclosure, a shared item, includes a collecting module configured to collect a user feature, a sending module configured to send the collected user feature, a receiving module configured to receive response information, and a response module configured to cause the shared item to perform a predetermined response based on the response information.

According to an exemplary arrangement, the shared item may further include a positioning module configured to obtain location information of the shared item.

According to an exemplary arrangement, the shared item may further include an input device configured to receive input information from a user.

According to an exemplary arrangement, the user feature includes a biometric feature of a user or an electronic tag feature of the user, the biometric feature includes at least one of a fingerprint, a sound, an iris, a facial feature, a DNA feature, and the electronic tag feature includes a user identifier in a wearable device of the user. In an arrangement of the present disclosure, the biometric feature of the user or the electronic tag feature of the user may include only two situations: the user feature includes only the biometric feature of the user, or the user feature includes both the biometric feature of the user and the electronic tag feature of the user.

According to an exemplary arrangement, the shared item may further include a personalization module configured to perform a personalized response according to customized information contained in the response information.

According to another aspect of the present disclosure, a shared server includes a receiving module configured to receive a user feature, a comparison module configured to compare the user feature with a pre-stored reference user feature, a determinization module configured to determine whether the user feature matches the reference user feature, and a sending module configured to send server information according to a determination result of the determination module.

According to an exemplary arrangement, the receiving module is further configured to receive location information.

According to an exemplary arrangement, the sending module is further configured to send information for requesting input of a password, the receiving module is further configured to receive information of the input password, the determination module is further configured to determine whether the information of the password matches a stored reference password, and the sending module is further configured to send second server information according to a determination result.

According to an exemplary arrangement, the shared server further include: an information obtaining module configured to obtain personalized information of a user according to the user feature, and a customization module configured to generate customized information according to the personalized information of the user, and include the customized information into the server information.

According to another aspect of the present disclosure, a shared item management method includes collecting a user feature which is used to identify a user, sending the collected user feature, verifying the user feature and returning server information according to the verification result, receiving the server information which includes at least one of the verification result regarding verification of the user feature and/or instruction information for a shared item, and causing the shared item to perform a predetermined response based on the server information.

According to an exemplary arrangement, the method further includes acquiring location information of the shared item to send location information of the shared item to a shared server and/or receiving input information from a user According to an exemplary arrangement, the method further includes collecting information of the shared item. The information of the shared item includes mechanical structure information of the shared item, and status information of the shared item, sending the information of the shared item, so that a shared server performs matching according to the user feature and the information of the shared item and selects a shared item that matches the user feature, receiving server information. The server information further includes at least one of identification information of the shared item that matches the user feature and a shared item parameter that matches the user feature, according to at least one of the identification information of the shared item that matches the user feature and the shared item parameter that matches the user feature, performing at least one of assigning the shared item and adjusting a parameter of the shared item.

BRIEF DESCRIPTION OF THE DRAWINGS

The accompanying drawings, which constitute a part of the description, are intended to provide a further understanding of the disclosure along with the specific arrangements described below but are not intended to limit the present disclosure.

DETAILED DESCRIPTION

In order to enable those skilled in the art to better understand the technical solutions of the present disclosure, a shared item and a shared server provided by the present disclosure will be further described in detail below with reference to the accompanying drawings and specific arrangements.

Figure 1:
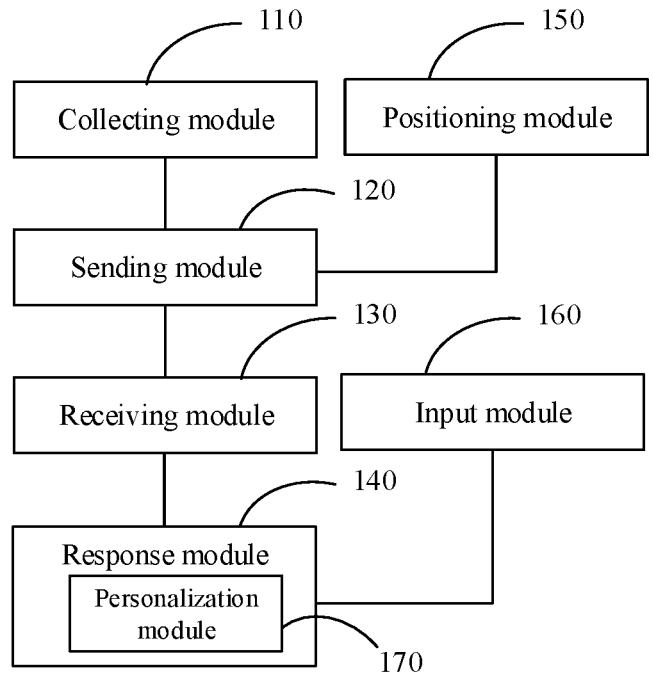
FIG. 1 is a schematic diagram showing a shared item according to an arrangement of the present disclosure.

FIG. 1 is a schematic diagram of a shared item according to an arrangement of the present disclosure. Referring to FIG. 1, the shared item according to the arrangement may include a collecting module 110 configured to collect a user feature, a sending module 120 configured to send the collected user feature, a receiving module 130 configured to receive response information, and a response module configured to cause the shared item to perform a predetermined response based on the response information.

According to the present disclosure, the shared item may be various types of shared items, such as a shared bicycle, a shared car, a shared charger, a shared umbrella, and the like, and the present disclosure does not impose specific limitations on this. In addition, in the present disclosure, it should be noted that the concept of the shared item is not limited to a specific item that can be taken away by a user, but also includes an auxiliary device which is related to the specific item for accommodating, locking, and presenting the specific item, or a wired and/or wireless system capable of controlling and managing multiple nearby items of the same kind. For example, for a shared charge pal (i.e., a mobile power supply), the shared item herein includes not only the charge pal itself, but also a base or other auxiliary devices (attachment devices) provided for storing, locking, and presenting the charge pal.

The collecting module 110 can be placed anywhere on the shared item. In particular, the collecting module 110 can be placed in a location that is easily accessible by a user. For example, for a shared bicycle, the collecting module may be disposed at a position such as the handlebar, the frame, the front set, and the like, or may be disposed on an auxiliary device of the shared item, and the present disclosure does not impose specific limitations on this.

The collecting module 110 can collect features of a user. For example, the collecting module 110 can acquire at least one of biometric features of the user, such as fingerprints, sounds, irises, facial features, DNA features. Specifically, the collecting module 110 may be a fingerprint identifier. When the user's finger touches the collecting module 110, the collecting module 110 identifies the fingerprint(s) of the user, thus collecting the fingerprint feature of the user. In addition, the collecting module 110 can also be a camera, a scanner and so on, so as to collect biometric features of the user as the user approaches and uses the shared item. Since the user feature(s) has (have) a certain degree of uniqueness, after the user feature(s) is(are) collected, the user feature(s) can be used to identify the user.

The sending module 120 can send the collected user feature(s). Specifically, the sending module 120 can send the user feature(s) to the outside of the shared item, for example, to a shared server or the like. The sending module 120 can communicate with the outside through a wired or wireless connection. For example, the sending module 120 can communicate with an external shared server through a connection manner such as Bluetooth, cellular network, WiFi, etc., thus transmitting the collected user features to the shared server. For example, the sending module 120 can be a transmitter that follows a particular communication protocol (e.g., Bluetooth protocol, cellular network protocol, WiFi protocol, etc.). The present disclosure is not limited to the disclosed communication protocols, and the sending module 120 may also transmit information about the user features to other external devices, for example, the information about the user features may be transmitted to other shared items in the vicinity.

The receiving module 130 receives response information from the outside. After the sending module 120 transmits the user information to the outside (for example, to the shared server), the shared server may return the corresponding response information based on the user information, and the response information may be received by the receiving module 130. The receiving module 130 can communicate with the outside through a wired or wireless connection. For example, the receiving module 130 can communicate with an external shared server through a connection manner such as Bluetooth, cellular network, WiFi, etc., to receive response information from the outside. For example, the receiving module 130 can be a receiver that follows a particular communication protocol (e.g., Bluetooth protocol, cellular network protocol, WiFi protocol, etc.). The present disclosure is not limited to the disclosed communication protocols, and the receiving module 130 receives response information from a device other than the shared server, for example, the receiving module 130 receives response information from other shared items in the vicinity.

In this arrangement, the sending module 120 and the receiving module 130 may be configured as one wireless transmission device, or may be separate hardware modules or software modules, and the present disclosure does not impose specific limitations on this.

The response module 140 causes the shared item to perform a predetermined response based on the response information. Here, the predetermined response may be determined according to the content of the response information. For example, when the response information indicates that the user is a normal user and the shared item can be used, the predetermined response may be unlocking the shared item so that the user can use the shared item normally. In addition, in this case, the predetermined response may further include starting to calculate the usage time, calculating the usage fee, and the like. In the present arrangement, the response module 140 can be constructed using a processor, microprocessor, a logic circuit, etc., or the response module 140 can be implemented using computer readable codes that can be executed on a processor.

In one arrangement, the shared item may further include a positioning module 150 that may acquire location information of the shared item and may transmit the location information to the outside through the sending module 120. An external device such as a shared server can perform functions such as calculating a route, positioning, and the like through the location information.

Additionally, in one arrangement, the shared item may also include an input device 160 to receive input information from the user. For example, if the response information indicates that the user needs to enter a password to use the shared item, the shared item may prompt the user to enter the password using the input device 160 to unlock and use the shared item. In addition, the input device can also be used to input other information such as registration information, and further details will not be described here. Whether the password is right may be determined locally at the shared item, or the password may be sent to the server which in turn determines whether the password is right. The present disclosure does not impose specific limitations on this.

In the above description, user's biometric information is collected as a user feature. However, in another arrangement of the present disclosure, the user feature may also include the user's electronic tag feature. In this example, a wearable device such as an electronic tag, a smart watch, a smart bracelet, smart glasses, and the like can be worn or worn by the user, and when the user needs to use the shared item, the collecting device 120 can read the electronic tag feature in the wearable device as the user feature. Since the electronic tag feature also has a certain degree of uniqueness, it can also be used as a user feature to identify a user.

In addition, the predetermined response performed by the shared item is not limited to the above response. For example, the predetermined response may further include performing personalized settings on the shared item according to the user feature included in the response information or selecting a specific member or portion from multiple available members or portions of the shared item.

For example, for a shared bicycle, the response information received from the outside (of the bicycle) may further include personalized information such as the height information of the user, and thus the shared bicycle may include a personalization module 170 to automatically adjust the height of the seat according to the height of the user. Alternatively, it is possible to prompt the user to use the available bicycles in the nearby with appropriate frame height or seat height according to the height of the user. The personalization module 170 may be configured as a portion of the response module 140, or may also be configured as a separate module, and the present disclosure does not impose specific limitations on this. For example, the personalization module 170 can be a separate module that is independent of the response module 140 and can perform personalized responses in response to customization information, such as adjusting seat height and the like. Alternatively, the personalization module 170 can also be a separate module that is independent of the response module 140 and can transmit personalized instruction information to the response module 140 in response to the customization information such that the response module 140 performs a personalized response, such as adjusting the seat height. In this case, as described above, the shared bicycle is not limited to the bicycle itself, but also includes a wired and/or wireless system capable of controlling and managing a plurality of specific items of the same kind in the vicinity. That is, one shared bicycle can transmit the personalized information that the user needs to have a higher frame to the outside through the sending module 120, and the nearby bicycles receives the information as the response information through the receiving module 130, and the bicycle that meets the requirement (for example, a bicycle with a higher frame) may perform a predetermined response in response to the response information, such as unlocking, issuing a prompt message (such as acousto-optic information), and the like.

Figure 2:
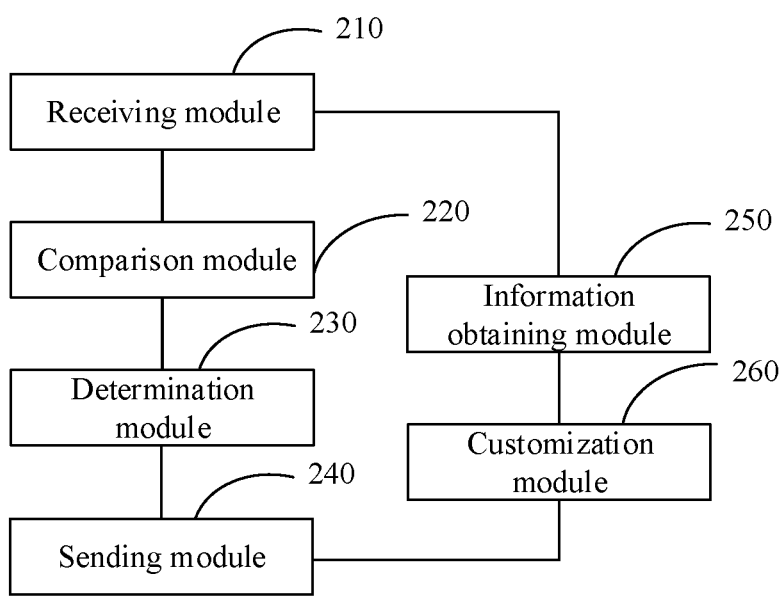
FIG. 2 is a schematic diagram showing a shared server according to an arrangement of the present disclosure.

FIG. 2 is a schematic diagram of a shared server according to an arrangement of the present disclosure. Referring to FIG. 2, a shared server includes a receiving module 210 configured to receive a user feature from the outside (i.e., the outside of the server), a comparison module 220 configured to compare the user feature with a pre-stored reference user feature, a determination module 230 configured to determine whether the user feature matches the reference user feature, and a sending module 240 configured to send response information to the outside according to the determination result of the determination module 230.

The receiving module 210 can receive information about user features from outside via a wireless link or a wired connection. For example, the receiving module 210 can receive the user feature sent from the shared item to the shared server. Detailed description of the user feature can be found in descriptions regarding previous arrangements and repeated descriptions are omitted.

The comparison module 220 may compare the user feature with a pre-stored reference user feature, and the determination module 230 determines whether the user feature matches the reference user feature, and the sending module 240 sends response information to the outside according to the determination result of the determination module 230. The reference user feature may be user information previously stored in the server, such as registration information of the user and the like. When the received user feature matches the reference user feature, the user may be determined to be a registered valid user, and thus the response information related to the valid user may be sent to the shared item, such as sending permission to all the user to use the shared item, unlocking the shared item, and the like. When the received user feature does not match any of the reference user features, it is determined that the user is an unregistered user, and thus the response information related to the unregistered user may be sent to the shared item, such as refusal to use the shared item, registration invitation, and so on.

In addition, the receiving module 210 can also receive location information from the outside. Specifically, when the shared item can provide location information, the receiving module 210 can receive the location information, and the server can perform functions such as calculating a route, positioning and the like according to the location information. However, the present disclosure is not limited thereto, and the server may also utilize the location information to implement other functions. For example, the shared server may select user feature databases based on the user feature and determine a range of user feature databases based on the location information. For example, if the receiving module 210 receives the location information of a District A, the database of the resident population features of the District A, the database of the floating population features of the District A, and the database of the resident population features of Beijing can be selected in the first place.

The response information of this arrangement may include a variety of information, and may be transmitted in multiple times. For example, in a case where the user is required to input a password to use the shared item, the information requesting the input of the password may be transmitted through the sending module 240. In this case, after the user inputs the password, the receiving module 210 receives the password information from the outside. At this time, the determination module 230 can determine whether the password information matches the stored reference password, and the sending module 240 sends the response information to the outside again according to the determination result. For example, if there exists a password match, the response information sent second time may include information such as information indicating that the verification is passed, information indicating permission to use the shared item, unlocking of the shared item, calculation of fees, and the like.

In an arrangement, the determination module may further determine whether the user feature matches a preset service category. For example, if a first preset feature is satisfied (such as the fingerprints of the thumb and the little finger match the reference features), the user is provided with a service for borrowing the shared item. If a second preset feature is satisfied (such as the fingerprints of middle finger and the index finger match the reference features), the user is provided with a service for returning the shared item.

In this arrangement, the user feature includes a biometric feature of the user or an electronic tag feature of the user. The biometric feature includes at least one of a fingerprint, a sound, an iris, a facial feature, and a DNA feature, and the electronic tag feature includes a user identifier in a wearable device of the user. In an arrangement of the present disclosure, the biometric feature of the user or the electronic tag feature of the user may include only two situations: the user feature includes only the biometric feature of the user, or the user feature includes both the biometric feature of the user and the electronic tag feature of the user. Detailed description of the user feature can be found in the descriptions regarding the previous arrangements and repeated descriptions are omitted here.

In another arrangement, the shared server may further include an information obtaining module 250. The information obtaining module 250 may acquire personalized information of the user according to the user feature. For example, the information obtaining module can acquire personalized information of the user according to the feature information of the user through technologies such as the Internet and big data, thus providing personalized services to the user.

In addition, the shared server may further include a customization module 260 which is configured to generate customized information according to the personalized information of the user, and include the customized information into the response information. For example, as specifically described in the foregoing arrangements, the adjustment of the seat height or bicycles of different heights may be provided according to the personalized information of the user.

Each module or unit in the shared server may be implemented by one or more digital signal processors (DSPs), application specific integrated circuits (ASICs), processors, microprocessors, controllers, microcontrollers, field programmable arrays (FPGA), programmable logic devices or other electronic units or any combination thereof. Some of the functions or processes described in the present disclosure can also be implemented by software executing on a processor.

For example, an arrangement of the present disclosure further provides a shared processor, including a processor and a memory (e.g., ROM, RAM, optical disk, or disk, and the like) for storing processor-executable instructions.

The processor is configured to perform steps in the above described methods. With the shared item and shared server of the present disclosure, user feature of a user can be collected. The user feature is transmitted to the server. Response information from the server is received. The shared item is caused to perform a predetermined response according to the response information. Therefore, services associated with the shared item can be provided while the user does not need to carry mobile terminals such as a mobile phone. Accordingly, the user can still use the shared item if he forgets to carry the mobile phone or the battery of the mobile phone is run out, or the mobile phone fails.

In the present disclosure, the response information is not limited to the information generated in response to an external request, but may include information generated for any response activity performed with respect to the source information. For example, in some arrangements of the present disclosure, the response information may also be referred to as server information.

Referring to FIGS. 1 and 2, an arrangement of the present disclosure further provides a shared item management system. The system includes a shared item and a shared server. The shared item includes a collecting module, a sending module, a receiving module and a response module. The collecting module is configured to collect a user feature which is used to identify a user. The sending module is configured to send the collected user feature. The shared server is configured to verify the user feature and return server information according to a verification result. The receiving module is configured to receive server information. The server information includes verification result regarding verification of the feature information. The response module is configured to cause the shared item to perform a predetermined response based on the server information. If the user feature includes both a biometric feature of the user or an electronic tag feature of the user, the collecting module includes a biometric feature collecting sub-module (not shown) for collecting the biometric feature of the user and a tag feature collecting sub-module (not shown) for collecting the electronic tag feature of the user.

The collecting module, the sending module, the receiving module, and the response module of the shared item in the management system according to the present arrangement are substantially the same as the collecting module 110, the sending module 120, the receiving module 130, and the response module 140 described with reference to FIG. 1 and thus repeated descriptions thereof will be omitted.

Optionally, the shared item management system further includes: a positioning module configured to acquire location information of the shared item to send location information of the shared item to the shared server, and/or an input device configured to receive input information from the user.

The positioning module and the input device in the shared item management system according to the present arrangement are substantially the same as the positioning module 150 and the input device 160 described with reference to FIG. 1, and thus their repeated descriptions will be omitted.

Optionally, the sending module is further configured to send the user feature to the shared server by using a wide area network wireless communication technology or to send the user feature to a relay device by using a local network wireless communication technology. The relay device sends the user feature to the shared server.

In this arrangement, the wide area network wireless communication technology may include communication technologies such as 3G, 4G, 5G, and NB-IOT. The local network wireless communication technology may be communication technologies such as Bluetooth or WiFi. The disclosure does not impose specific limitations on this. The wide area network wireless communication technology and the local area network wireless communication technology may also be other wireless communication technologies known in the art or developed in the future.

In addition, in this arrangement, the relay device may be the auxiliary device which, as a part of the shared item, is related to the specific item for accommodating, locking, and presenting the specific item as described in the foregoing arrangement. Or, the relay device may be an additional device such as a relay device set up in a shared site. For example, taking a shared bicycle as an example, the auxiliary device may be a shared item management device provided on a fixture (e.g., a console, a public street light pole near a station) in a shared bicycle docking station, and the relay device can be integrated in the shared item management device.

In addition, the present disclosure is not limited thereto, and in other arrangements of the present disclosure, the auxiliary device may also be provided in one or more specific shared items. For example, a specific shared item (e.g., a shared bicycle) can be used as an auxiliary device to other shared bicycles in its vicinity. More specifically, in the arrangement of the shared bicycle, the collecting module 110 is further configured to collect information regarding members of the bicycle (e.g., mechanical information such as seat height, or status information such as whether the bicycle is faulty). The sending module 120 is further configured to transmit the location information of the bicycle, such that the shared server acquires information regarding members of other shared bicycles within a certain distance range according to the location information of the shared bicycle. The receiving module 130 is further configured to receive information from the shared server, and the information further includes identification information of bicycles that matches the user feature. The response module 140 is further configured to allocate the shared bicycle according to the identification information of the shared bicycle that matches the user feature. It should be understood that the present arrangement is not limited to shared bicycles, but can be applied to other shared items.

Optionally, the collecting module is further configured to collect information of the shared item, including mechanical structure information of the shared item or status information of the shared item. The sending module is further configured to send the shared item information, so that the shared server is configured to perform matching according to the user feature and the information of the shared item and to select a shared item matching the user feature. The receiving module is further configured to receive response information, and the response information may be response information determined based on the user feature, and the response information also includes identification information of the shared item that matches the user feature and/or a parameter of the shared item that matches the user feature. The response module is further configured to: assign a shared item and/or adjust the parameter of the shared item according to the identification information of the shared item that matches the user feature and/or a parameter of the shared item that matches the user feature. In one non-limiting arrangement, the personalization module 170 described with reference to the previous arrangements can be utilized to assign a shared item and/or adjust the parameter of the shared item according to the identification information of the shared item that matches the user feature and/or a parameter of the shared item that matches the user feature. Specifically, for example, in the shared bicycle system, the system may assign a bicycle having an appropriate seat height to a user according to the height of the user, or the seat height of the bicycle assigned to the user may be automatically adjusted according to the height of the user. More specifically, in the arrangement, the mechanical structure information may include information such as the seat height of the bicycle, the size of the frame, and the like, and the status information may include the status of each shared bicycle, such as whether the bicycle has a problem or defect, whether the bicycle is normal, and the like.

Accordingly, according to another arrangement of the present disclosure, there is provided a shared item management method. The method includes collecting a user feature which is used to identify a user, sending the collected user feature, verifying the user feature and returning response information according to the verification result, receiving the response information which includes the verification result regarding verification of the user feature, and causing the shared item to perform a predetermined response based on the server information.

In one arrangement, the method further includes: acquiring location information of the shared item to send location information of the shared item to a shared server, and/or receiving input information from a user.

In an arrangement, the transmitting of the collected user feature further includes: transmitting the user feature to the shared server by using a wide area network wireless communication technology or transmitting the user feature to the relay device by using a local network wireless communication technology. The relay device sends the user feature to the shared server.

In one arrangement, the method further includes: collecting information of the shared item, the information of the shared item including mechanical structure information of the shared item, or status information of the shared item, sending the information of the shared item, so that a shared server performs matching according to the user feature and the information of the shared item and selects a shared item that matches the user feature, receiving response information, where the response information further includes at least one of identification information of the shared item that matches the user feature and a shared item parameter that matches the user feature, according to at least one of the identification information of the shared item that matches the user feature and the shared item parameter that matches the user feature, performing at least one of assigning the shared item and adjusting a parameter of the shared item.

More specific features of the management system and management method for the shared item according to the arrangement of the present disclosure can be found in previous descriptions regarding arrangements of the present disclosure with reference to FIGS. 1 and 2 and repeated descriptions will not be described.

Figure 3:
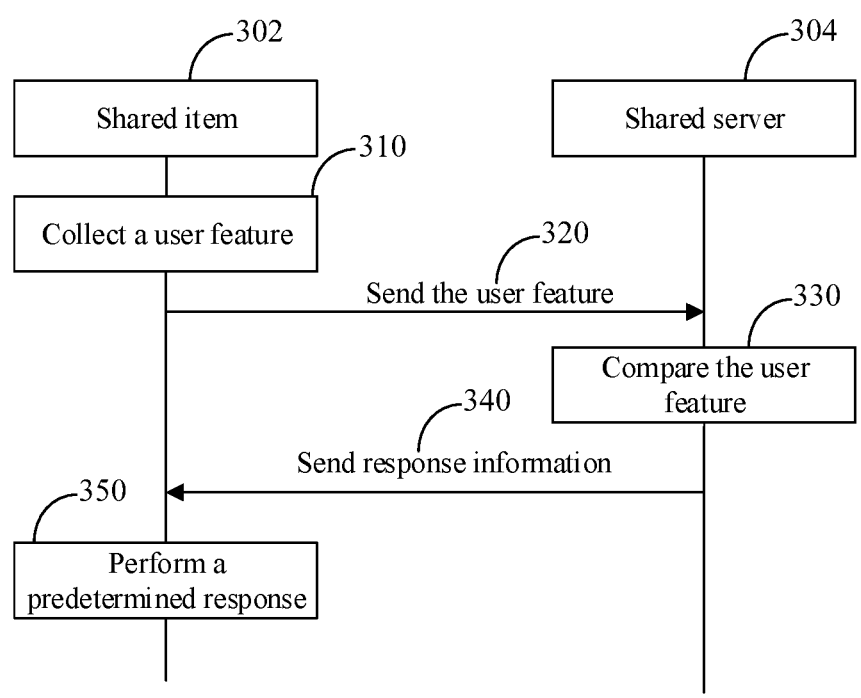
FIG. 3 is a schematic diagram showing a control method for a shared item and a shared server according to an arrangement of the present disclosure.

FIG. 3 is a schematic diagram showing a control method for a shared item and a shared server according to an arrangement of the present disclosure.

Referring to FIG. 3, a control method for a shared item and a shared server according to an arrangement of the present disclosure may include: collecting a user feature of a user, transmitting the user feature of the user to a server, receiving response information from the server, and enabling the shared item to perform a predetermined response.

Specifically, referring to FIG. 3, a shared item 302 first acquires or collect the user feature (e.g., fingerprint information) of the user at 310. The shared item 302 then sends the user feature to a shared server 304 at 320, thus requesting a response from the shared server 304. Next, the shared server 304 performs a determination based on information from the shared item 302 (e.g., the user feature, and in some arrangements, the information from the shared item 302 may also include location information of the shared item 302, etc.) to compare the user feature at 330, and transmits predetermined response information to the shared item 302 based on the determination result at 340. Next, after the shared item 320 receives the response information, a predetermined response can be performed based on the response information at 350.

For example, in an arrangement, if the shared server 304 determines that the user is a normal user, and the response information indicates that the user is a normal user, and the shared item 302 can be used, and the predetermined response may be unlocking the shared item 302, so that the user can normally use the shared item 302. In addition, in this case, the predetermined response may further include starting to calculate the usage time, calculating the usage fee, and the like.

In addition, if the shared server 304 determines that a password is required to use the shared item 302, the response message indicates that the user is required to input the password. In this case, the method may further include prompting the user to input a password according to the response information, causing the shared item 302 to perform a predetermined response according to the password input by the user. The predetermined response at this stage may include sending a password to the shared server 304, receiving a password matching result from the shared server 304, and the like. However, the present disclosure is not limited thereto, and in some cases, it may not be necessary to send a password to the shared server 304 for judgment. For example, the response module of the shared item 302 itself or other module or processor can be used to determine whether the password is correct, thus performing a corresponding response based on the determination result.

In one arrangement, the control method for the shared item and the shared server according to the present disclosure may include acquiring personalized information of the user according to the user feature, generating customized information according to the personalized information, and enabling the shared item to perform the predetermined response according to the customized information. For example, referring to the foregoing arrangements, after the personalized information of the user is obtained, the personalized customized service can be provided to the customer according to the personalized information of the user, so that the user can be more conveniently served and the user experience can be improved.

In another arrangement, the control method for the shared item and the shared server according to an arrangement of the present disclosure may include: according to the type of the user feature, determining a response corresponding to the type of the user feature; and controlling the shared item to perform the corresponding response. For example, if a first preset feature is satisfied (such as the fingerprints of the thumb and the little finger match the reference features), the user is provided with a service for borrowing the shared item; if a second preset feature is satisfied (such as the fingerprints of middle finger and the index finger match the reference features), the user is provided with a service for returning the shared item.

More specific operations and configurations of the shared item and the shared server in the control method according to the present arrangement can be found in the descriptions regarding the foregoing arrangements, and repeated descriptions are omitted here.

It is to be understood that the above arrangements are merely exemplary arrangements provided to explain the principles of the present disclosure, but the present disclosure is not limited thereto. Various modifications and improvements can be made by those skilled in the art without departing from the spirit and scope of the disclosure, and such modifications and improvements also fall with the scope of the present disclosure.

What is claimed is:

1. A shared item management system, comprising:
 a shared server; and
 a shared item, the shared item comprising a collecting module, a sending module, a receiving module, a positioning module, an input device, and a response module, wherein
  the collecting module is configured to collect a user feature which is used to identify a user;
  the sending module is configured to send the collected user feature;
  the shared server is configured to verify the user feature and return server information according to a verification result;
  the receiving module is configured to receive the server information, wherein the server information comprises at least one of the verification result regarding verification of the user feature or instruction information for the shared item;
  the response module is configured to cause the shared item to perform a predetermined response based on the server information;
  the positioning module configured to acquire location information of the shared item and to send the location information of the shared item to the shared server; and
  the input device configured to receive input information from the user, wherein
   the collecting module is further configured to collect information of the shared item, wherein the information of the shared item comprises at least one of mechanical structure information of the shared item, status information of the shared item, or identification information of the shared item;

the sending module is further configured to send the information of the shared item or the location information;

the shared server performs matching according to the user feature and the information of the shared item and selects the shared item that matches the user feature;

the receiving module is further configured to receive the server information, wherein the server information further comprises at least one of identification information of the shared item that matches the user feature or a shared item parameter that matches the user feature;

the response module is further configured to perform at least one of:
assigning the shared item according to the identification information of the shared item that matches the user feature and a parameter of the shared item that matches the user feature; or
adjusting the parameter of the shared item according to the identification information of the shared item that matches the user feature and the parameter of the shared item that matches the user feature.

2. A shared item, comprising:
a collecting module configured to collect a user feature;
a sending module configured to send the collected user feature;
a receiving module configured to receive response information;
a response module configured to cause the shared item to perform a predetermined response based on the response information;
a positioning module configured to acquire location information of the shared item and to send the location information of the shared item to the shared server; and
an input device configured to receive input information from the user, wherein
the collecting module is further configured to collect information of the shared item, wherein the information of the shared item comprises at least one of mechanical structure information of the shared item, status information of the shared item, or identification information of the shared item;
the sending module is further configured to send the information of the shared item or the location information;
the shared server performs matching according to the user feature and the information of the shared item, and selects the shared item that matches the user feature;
the receiving module is further configured to receive server information, wherein the server information further comprises at least one of identification information of the shared item that matches the user feature or a shared item parameter that matches the user feature;
the response module is further configured to perform at least one of:
assigning the shared item according to the identification information of the shared item that matches the user feature and a parameter of the shared item that matches the user feature; or
adjusting the parameter of the shared item according to the identification information of the shared item that matches the user feature and the parameter of the shared item that matches the user feature.

3. The shared item according to claim 2, wherein
the user feature comprises a biometric feature of a user or an electronic tag feature of the user, the biometric feature comprises at least one of a fingerprint, a sound, an iris, a facial feature, or a DNA feature, and
the electronic tag feature comprises a user identifier in a wearable device of the user.

4. The shared item according to claim 2, further comprising:
a personalization module configured to perform a personalized response according to customized information contained in the response information.

5. A shared server in communication with a shared item, comprising:
a receiving module configured to receive a user feature from the shared item;
a comparison module configured to compare the user feature with a pre-stored reference user feature;
a determinization module configured to determine whether the user feature matches the reference user feature; and
a sending module configured to send server information according to a determination result of the determination module, wherein
the sending module is further configured to send information for requesting input of a password;
the receiving module is further configured to receive information of the input password;
the determination module is further configured to determine whether the information of the password matches a stored reference password; and
the sending module is further configured to send second server information according to a determination result.

6. The shared server according to claim 5, wherein the receiving module is further configured to receive location information from the shared item.

7. The shared server according to claim 5, further comprising:
an information obtaining module configured to obtain personalized information of a user according to the user feature; and
a customization module configured to generate customized information according to the personalized information of the user, and include the customized information into the server information.

8. A shared item management method, comprising:
collecting a user feature which is used to identify a user;
sending the collected user feature;
verifying the user feature and returning server information according to the verification result;
receiving the server information, wherein the server information comprises at least one of the verification result regarding verification of the user feature or instruction information for a shared item;
causing the shared item to perform a predetermined response based on the server information;
collecting information of the shared item, wherein the information of the shared item comprises mechanical structure information of the shared item, and status information of the shared item;
sending the information of the shared item, wherein a shared server performs matching according to the user feature and the information of the shared item and selects the shared item that matches the user feature;

receiving the server information, wherein the server information further comprises at least one of identification information of the shared item that matches the user feature or a shared item parameter that matches the user feature;

according to at least one of the identification information of the shared item that matches the user feature or the shared item parameter that matches the user feature, performing at least one of assigning the shared item or adjusting a parameter of the shared item.

9. The shared item management method according to claim 8, further comprising at least one of:

acquiring location information of the shared item to send location information of the shared item to a shared server; or receiving input information from a user.

* * * * *